US012705319B2

(12) United States Patent
Gyeon

(10) Patent No.: US 12,705,319 B2
(45) Date of Patent: Aug. 11, 2026

(54) METHOD OF INSERTING AUDIO-WATERMARK SPECIALIZED FOR MUSIC USAGE AND NFT AND PROVIDING MUSIC SOURCE

(71) Applicant: Du-Heon Gyeon, Incheon (KR)

(72) Inventor: Du-Heon Gyeon, Incheon (KR)

( * ) Notice: Subject to any disclaimer, the term of this patent is extended or adjusted under 35 U.S.C. 154(b) by 19 days.

(21) Appl. No.: 18/957,970

(22) Filed: Nov. 25, 2024

(65) Prior Publication Data

US 2025/0174239 A1 May 29, 2025

(30) Foreign Application Priority Data

Nov. 29, 2023 (KR) ........................ 10-2023-0169409

(51) Int. Cl.

| | |
|---|---|
| ***G06F 21/16*** | (2013.01) |
| ***G06F 21/10*** | (2013.01) |
| ***G10L 19/018*** | (2013.01) |
| ***G11B 20/00*** | (2006.01) |
| *G06F 21/31* | (2013.01) |

(52) U.S. Cl.

CPC .......... *G06F 21/16* (2013.01); *G06F 21/1014* (2023.08); *G06F 21/1015* (2023.08); *G10L 19/018* (2013.01); *G11B 20/00891* (2013.01); *G06F 21/31* (2013.01); *G11B 20/00144* (2013.01)

(58) Field of Classification Search

CPC . G10L 19/018; G10L 19/08; G11B 20/00144; G11B 20/00891; G06F 21/16; G06F 21/10; G06F 21/1014; G06F 21/1015; G06F 21/31

See application file for complete search history.

(56) References Cited

U.S. PATENT DOCUMENTS

| | | | | |
|---|---|---|---|---|
| 7,094,949 | B2 * | 8/2006 | McLachlan | A01K 67/02 435/6.16 |
| 11,775,965 | B2 * | 10/2023 | Kim | G06Q 50/18 705/69 |
| 12,136,428 | B1 * | 11/2024 | Agaskar | G10L 19/018 |
| 2006/0059560 | A1 * | 3/2006 | Montulli | G06F 21/10 726/26 |
| 2009/0138484 | A1 * | 5/2009 | Ramos | G06F 16/00 |
| 2013/0219458 | A1 * | 8/2013 | Ramanathan | G06F 21/10 726/1 |
| 2014/0165119 | A1 * | 6/2014 | Liu | H04N 21/232 725/92 |
| 2018/0342258 | A1 * | 11/2018 | Huffman | G10L 21/013 |

(Continued)

FOREIGN PATENT DOCUMENTS

KR 10-2009-0093520 A 9/2009

*Primary Examiner* — Shaqueal D Wade-Wright

(74) *Attorney, Agent, or Firm* — Revolution IP, PLLC

(57) ABSTRACT

A method of inserting an audio watermark specialized for music usage and non-fungible token (NFT) and providing a music source includes receiving a music source download request from a user who accesses a music source providing system; authenticating whether the user is a legitimate user; receiving a music source usage purpose from the user when the user is the legitimate user; inserting an audio watermark including different types of data information into the music source according to the music source usage purpose; and performing a music source download requested by the user.

11 Claims, 4 Drawing Sheets

(56) References Cited

U.S. PATENT DOCUMENTS

| | | | | |
|---|---|---|---|---|
| 2023/0153775 | A1* | 5/2023 | Stuart | G06Q 20/38215 705/26.1 |
| 2024/0427851 | A1* | 12/2024 | Asaumi | G06F 21/10 |
| 2025/0378514 | A1* | 12/2025 | Clinton | G06Q 50/184 |

* cited by examiner

METHOD OF INSERTING AUDIO-WATERMARK SPECIALIZED FOR MUSIC USAGE AND NFT AND PROVIDING MUSIC SOURCE

CROSS-REFERENCE TO RELATED APPLICATION

This application is based on and claims priority under 35 U.S.C. § 119 to Korean Patent Application No. 10-2023-0169409, filed on Nov. 29, 2023, in the Korean Intellectual Property Office, the disclosure of which is incorporated by reference herein in its entirety.

BACKGROUND

1. Field

The present disclosure relates to a method of inserting audio watermarks specialized for music usage and non-fungible token (NFT) when providing a music source, and more particularly, to a method of inserting audio watermarks, which are specialized for music usage and NFT, differently depending on a type and usage purpose of music sources when providing the music sources.

2. Description of the Related Art

Music sources are important for delivering messages to viewers of video media. Unlike the past when the music sources were provided through radio, television, or music streaming sites, the music sources are now being inserted into videos published on video streaming sites (for example, YouTube, TikTok, and so on) or provided through applications for portable terminals.

The music sources are converted into audio data generated in digital form and provided through copyright transactions in online markets, but due to the nature of audio data generated in digital form, information may be easily stored or converted, and accordingly, the music sources may be copied and distributed without going through legitimate transactions.

Meanwhile, for the music sources provided through copyright transactions in online markets, audio data is encrypted and transmitted, and buyers may decrypt and use the encrypted audio data by entering a public key or a private key, but there is a limitation that the audio data is disclosed to a third party according to the buyer's intention, making it impossible to protect intellectual property rights.

Therefore, technology for inserting an audio watermark into audio data of the music source and providing the audio data is needed.

The technology that serves as the background of the present disclosure is described in Korean Patent Publication No. 10-2009-0093520 (published on Sep. 2, 2009).

SUMMARY

The present disclosure provides a method of inserting audio watermarks, which are specialized for music usage and non-fungible token (NFT), differently depending on a type and usage purpose of music sources when providing the music sources.

According to an aspect of the present disclosure, a method of inserting an audio watermark specialized for music usage and non-fungible token (NFT) and providing a music source includes receiving a music source download request from a user who accesses a music source providing system; authenticating whether the user is a legitimate user; receiving a music source usage purpose from the user when the user is the legitimate user; inserting an audio watermark including different types of data information into the music source according to the music source usage purpose; and performing a music source download requested by the user.

The music source usage purpose may include at least one of broadcast content, game insertion, movie insertion, promotion and advertisement, and performance.

The method may further include receiving, from the user, whether to use the music source online or offline; and receiving a corresponding uniform resource locator (URL) address when using the music source online, and receiving address information on the music source when using the music source offline.

In the inserting of the audio watermark into the music source, the audio watermark may be inserted in 10-second units or the audio watermark may be inserted in a highest frequency energy level within 10 seconds of a first playback, and greatest energy may be inserted within 5 to 10 seconds from an inserted point in time.

In the inserting of the audio watermark into the music source, the audio watermark may be inserted simultaneously in an ultra-low frequency band of 40 Hz or less and an ultra-high frequency band of 18,000 Hz or more.

The ultra-low frequency band may be 20 Hz or more and the ultra-high frequency band is 20,000 Hz or less.

In the inserting of the audio watermark into the music source, even when the same music source is used, when music source usage purposes are different, different types of data information may be stored in the audio watermark.

In the inserting of the audio watermark into the music source, even when music source usage purposes are the same, when music sources are different from each other, different types of data information may be stored in the audio watermark.

The data information may include at least one of basic music source information (a release date, an artist, an author, a performer, a playback length, and a genre) of the music source, user information (an encrypted identifier required for user authentication), use-related information (a usage approval number, a usage right expiration period, and a music usage purpose), and NFT information.

A permanent usage right may be provided when a user who downloads the music source through the NFT information matches an owner.

The method may further include detecting a usage frequency, a playback time, and a usage purpose of corresponding content in which the music source is used; and determining a usage fee payment rate based on a usage, a playback time, and a usage purpose of the detected content and paying a usage fee to an owner and an author of the music source.

The usage purpose may indicate a purpose for which the music source is used among a title song, an ending song, and a simple back ground music (BGM).

According to the present disclosure, illegal copying or usage of a music source may be prevented by inserting an audio watermark in consideration of a music source usage purpose and whether music sources are identical.

In addition, the quality of a music source may be maintained by simultaneously inserting audio watermarks in an ultra-low frequency band and an ultra-high frequency band and by inserting an audio watermark in the highest frequency energy level in a predetermined section.

In addition, profits may be objectively delivered to an owner and an author by determining a usage fee payment rate for a music source in consideration of the music source usage purpose and the usage of a music source.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
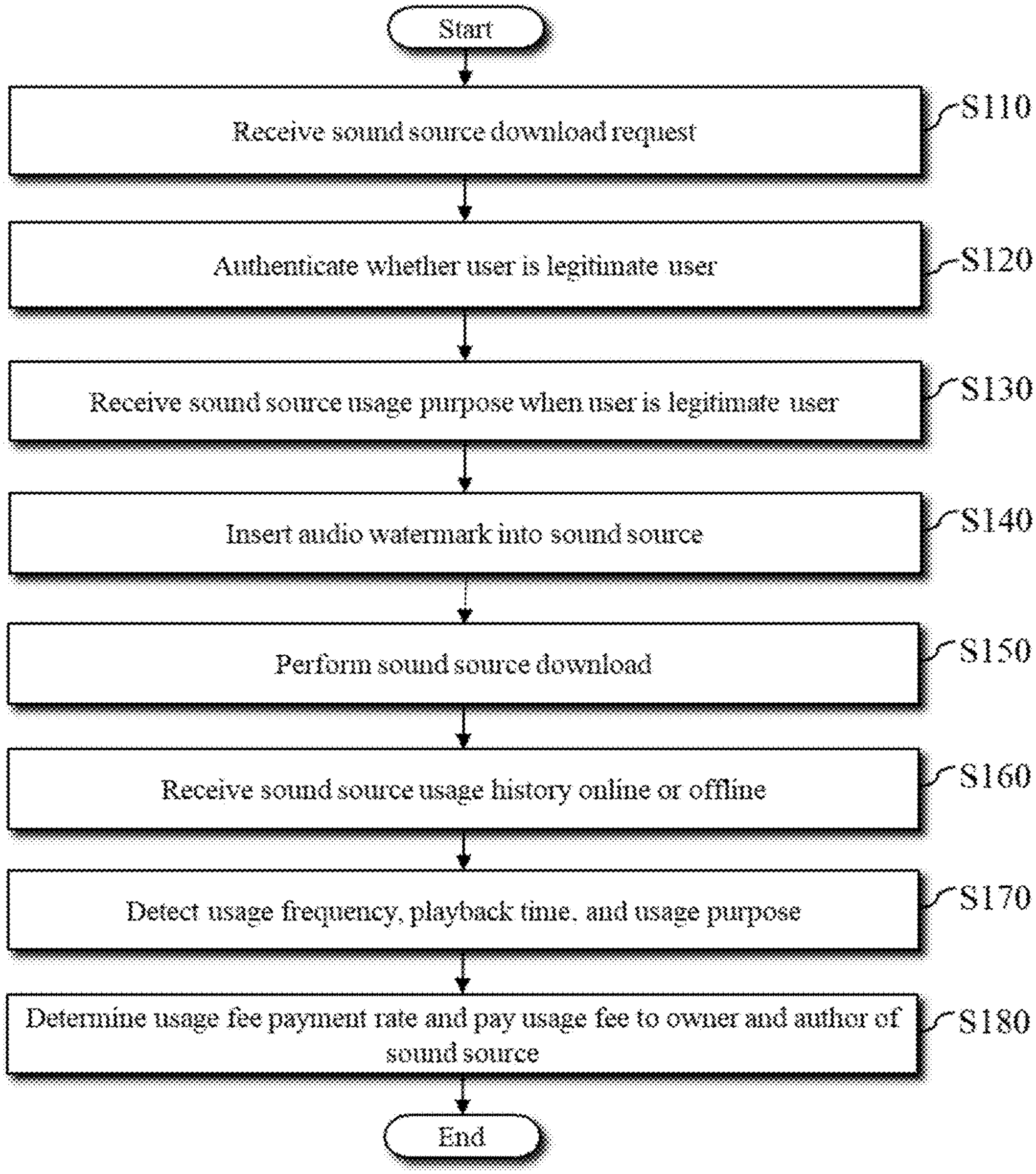
FIG. 1 is a flowchart of a method of inserting audio watermarks specialized for music usage and non-fungible token (NFT) when providing a music source, according to an embodiment of the present disclosure.

Hereinafter, preferred embodiments according to the present disclosure will be described in detail with reference to the attached drawings. In this process, thicknesses of lines and sizes of components illustrated in the drawings may be exaggerated for the sake of clarity and convenience of description.

In addition, the terms described below may be defined in consideration of their functions in the present disclosure and may change depending on the intention or custom of a user or operator. Therefore, definitions of the terms should be made based on the contents throughout the specification.

In the embodiments described below, a method of inserting audio watermarks specialized for music usage and non-fungible token (NFT) when providing a music source is performed by a music source providing system using a processing device or a user's device (for example, a smartphone, a computer, a laptop computer, a tablet personal computer (PC), or so on), and specific examples therefor are described. However, embodiments of the present disclosure are not limited thereto.

FIG. 1 is a flowchart of a method of inserting audio watermarks specialized for music usage and NFT when providing a music source, according to an embodiment of the present disclosure.

As illustrated in FIG. 1, a music source providing system receives a music source download request from a user who accesses the music source providing system (S110). Here, the music source providing system is connected to the user's terminal (for example, a mobile phone, a desktop computer, a tablet PC, or so on) through a network and may receive the music source download request from the user directly or indirectly. For example, the music source download request may be received from the user through a mouse, a touch pen, a part of the user's body, voice, or a keyboard.

Next, the music source providing system authenticates whether the user is a legitimate user (S120). Here, a legitimate user may be anyone of a user who may be authenticated with a mobile phone number, a subscriber who joins the music source providing system and is using a subscription product such as a membership subscription, and a user who joins the music source providing system to have an encrypted identifier or is registered with the copyright registration association.

Next, when the user is a legitimate user, the music source providing system receives the purpose of using a music source from the user (S130). Here, a music source usage purpose may be received directly or indirectly from the user. For example, the music source usage purpose may be received from the user through a mouse, a touch pen, a part of the user's body, voice, or a keyboard.

Specifically, when the user is a legitimate user, the music source providing system may receive, from the user, the music source usage purpose including at least one of broadcast content, game insertion, movie insertion, promotional and advertising, and performance.

Next, the music source providing system inserts an audio watermark including different data information into the music source according to the music source usage purpose (S140).

Here, the data information may include at least one of basic music source information (release date, artist, author, performer, playback length, genre, song title, album name, and so on), user information (encrypted identifier required for user authentication), use-related information (usage approval number, usage right expiration period, music usage purpose), and NFT information. In this case, the user information may be decrypted by and matched to a content platform (for example, YouTube, TikTok, or so on), a usage approval number may be a permanent unique value managed by the music source providing system and may identify whether false information is inserted from the outside, and the NFT information may include identification codes for a representative copyright holder and permanent usage rights holders of a music source in addition to copyright ownership information and a share ratio.

Specifically, in step S140, the music source providing system may insert an audio watermark into the music source in 10-second units or insert the audio watermark in the highest frequency energy level within 10 seconds of the first playback, and thereafter insert the highest energy within 5 to 10 seconds from the point in time of insertion. In this case, the frequency energy level is obtained by calculating energy of the sound emitted from a music source per second.

In addition, in step S140, the music source providing system may simultaneously insert audio watermarks in an ultra-low frequency band of 40 Hz or less and an ultra-high frequency band of 18,000 Hz or more.

In other words, in step S140, the music source providing system may simultaneously insert audio watermarks into the ultra-low frequency band of 20 Hz to 40 Hz and the ultra-high frequency band of 18,000 Hz to 20,000 Hz.

In addition, in step S140, the music source providing system may store different data information in the audio watermark even when the music source is used for different purposes.

According to one embodiment of the present disclosure, when the music source is used for broadcast content, the music source providing system may insert data information including basic music source information, use-related information, and NFT information into the audio watermark and store the data information in the music source, and when the music source is used for performance, the music source providing system may insert data information including basic music source information, user information, use-related information, and NFT information into the audio watermark and store the data information in the music source.

In addition, in step S140, the music source providing system may store different types of data information in the audio watermark even when the music source is used for different purposes.

Next, the music source providing system may perform a music source download requested by a user (S150).

Specifically, in step S150, the music source providing system may download a music source requested by a user to at least one of the user's terminal (for example, a mobile phone, a desktop computer, a tablet PC, or so on), Universal Serial Bus (USB), and a removable disk (for example, a secure digital (SD) card or so on).

In addition, in step S150, the music source providing system may issue a permanent usage authorization number when the music source download is completed. Here, the usage authorization number has a validity period of a predetermined period (for example, 1 month) and may be discarded when the music source use result is not authenticated by the music source providing system during the predetermined period. In this case, a method of authenticating to the music source providing system is a method of entering the music source usage history online or offline.

According to one embodiment of the present disclosure, in step S150, the music source providing system may download music information, a subtitle, and so on according to a user's selection signal.

Furthermore, in step S150, the music source providing system may provide a user with a permanent usage right when the user who downloads the music source through the NFT information match the owner.

Next, the music source providing system receives the history of using the music source online or offline from the user (S160). Here, the history of using the music source online or offline may be received directly or indirectly from the user. For example, the history may be received from the user through a mouse, a touch pen, a part of the user's body, voice, or a keyboard.

Figure 2:
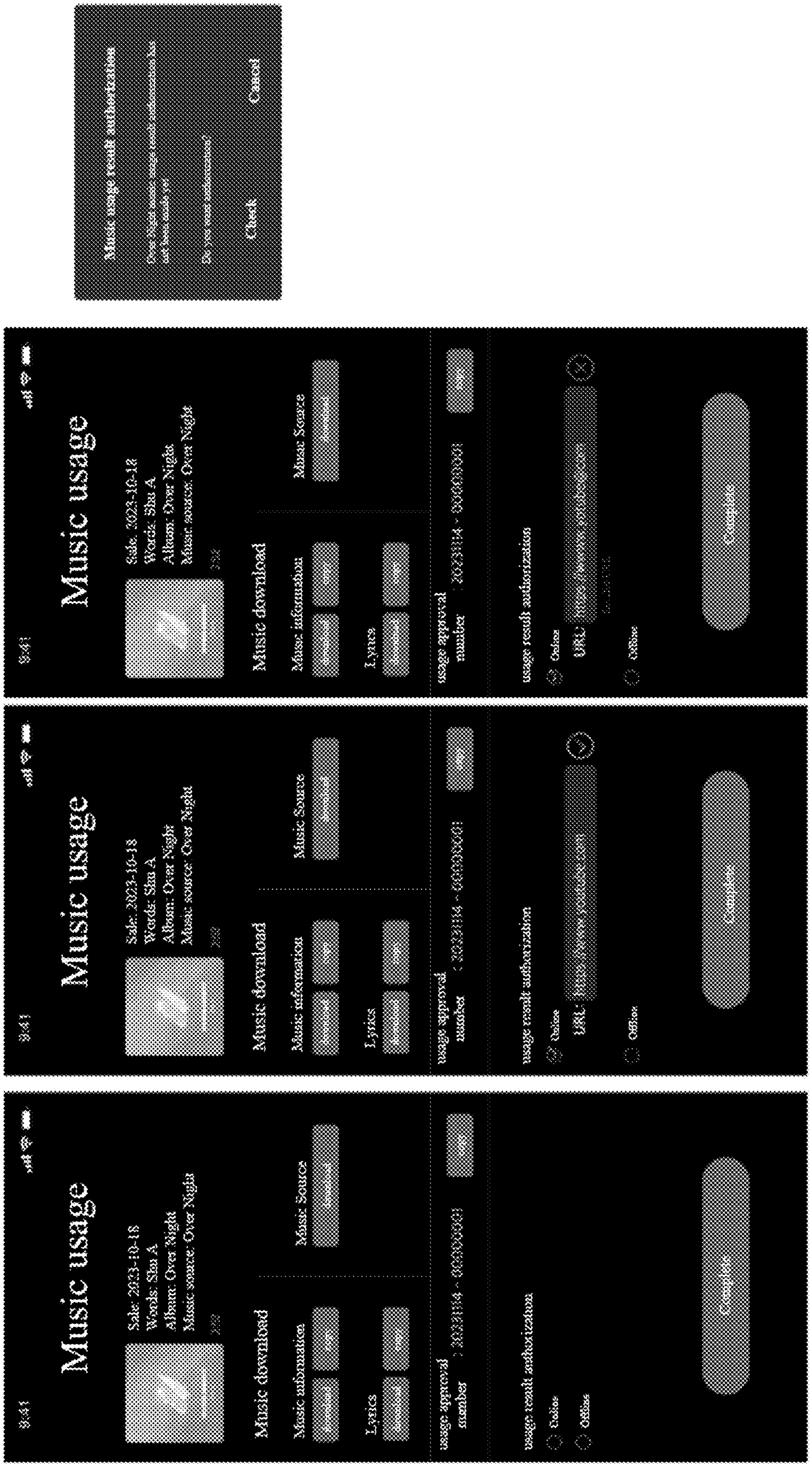
FIG. 2 is a view specifically illustrating a process of downloading a music source and authenticating online music source usage history, according to an embodiment of the present disclosure.

FIG. 2 is a view specifically illustrating a process of downloading a music source and authenticating online music source usage history, according to an embodiment of the present disclosure.

As illustrated in FIG. 2, when a user uses a music source online, the music source providing system may receive a URL address of content using the downloaded music source from the user.

Specifically, in step S160, the music source providing system may check whether a uniform resource locator (URL) input by a user is written according to a pre-specified rule (for example, a URL address ends with .com, .net, .kr, or so on), whether the content played bac through the URL matches an identification (ID) described in the user information, and whether a corresponding music source is actually used.

According to an embodiment of the present disclosure, the music source providing system may receive an address such as "https://youtu.be/fynvJweFX9E?si" from a user.

Figure 3:
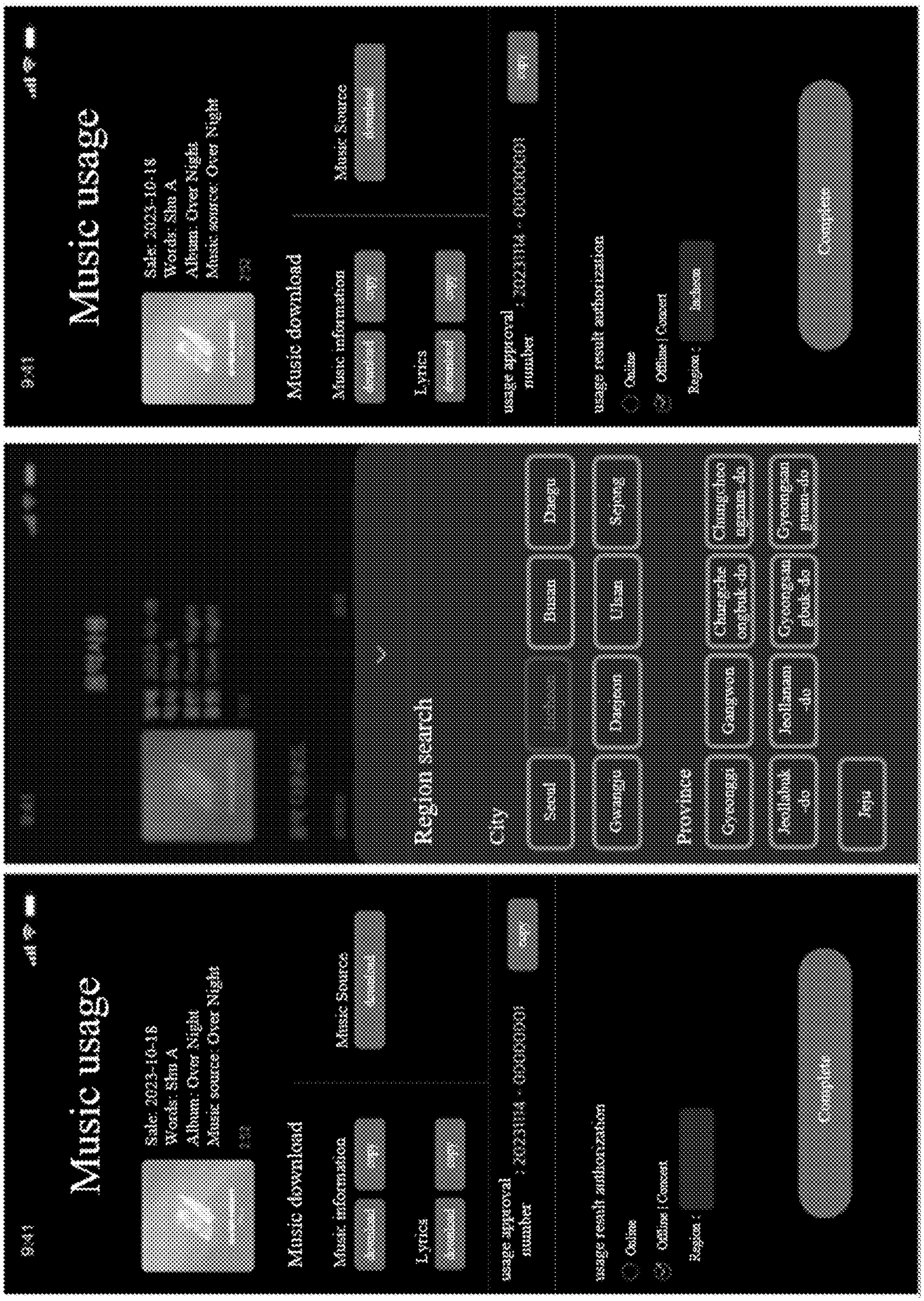
FIG. 3 is a view specifically illustrating a process of downloading a music source and authenticating offline music source usage history, according to an embodiment of the present disclosure.

FIG. 3 is a view specifically illustrating a process of downloading a music source and authenticating offline music source usage history, according to an embodiment of the present disclosure.

As illustrated in FIG. 3, a music source providing system may receive an address using a music source from a user.

In addition, in step S160, the music source providing system may receive a type of the used music source (for example, performance or so on) and an address using the music source from a user.

According to one embodiment of the present disclosure, the music source providing system may output a button indicating a special city, a metropolitan city, or a province to a user on a display device and receive an address using the music source according to a signal when the user selects the button, or receive an address of "294 Itaewon-ro, Hannam-dong, Yongsan-gu, Seoul" from the user.

Next, the music source providing system detects the usage frequency, playback time, and usage purpose of the corresponding content using the music source (S170). Here, the usage frequency means the frequency in which the music source is played back in the corresponding content (for example, the music source is played back three number of times in the content), the playback time means the total playback time of the corresponding content, and the usage purpose indicates the purpose for which the music source is used among a title song, an ending song, and a simple back ground music (BGM).

Finally, the music source providing system determines a usage fee payment rate based on the usage frequency, playback time, and usage purpose of the detected content and pays a usage fee to an owner and author of the music source (S180).

According to one embodiment of the present disclosure, the music source providing system may pay the usage fee to the owner and author of the music source by determining the usage fee payment rate as 40% for the author, 40% for the owner, and 20% for a music source investor based on the usage frequency, playback time, and usage purpose of the content in which the music source is used.

Figure 4:
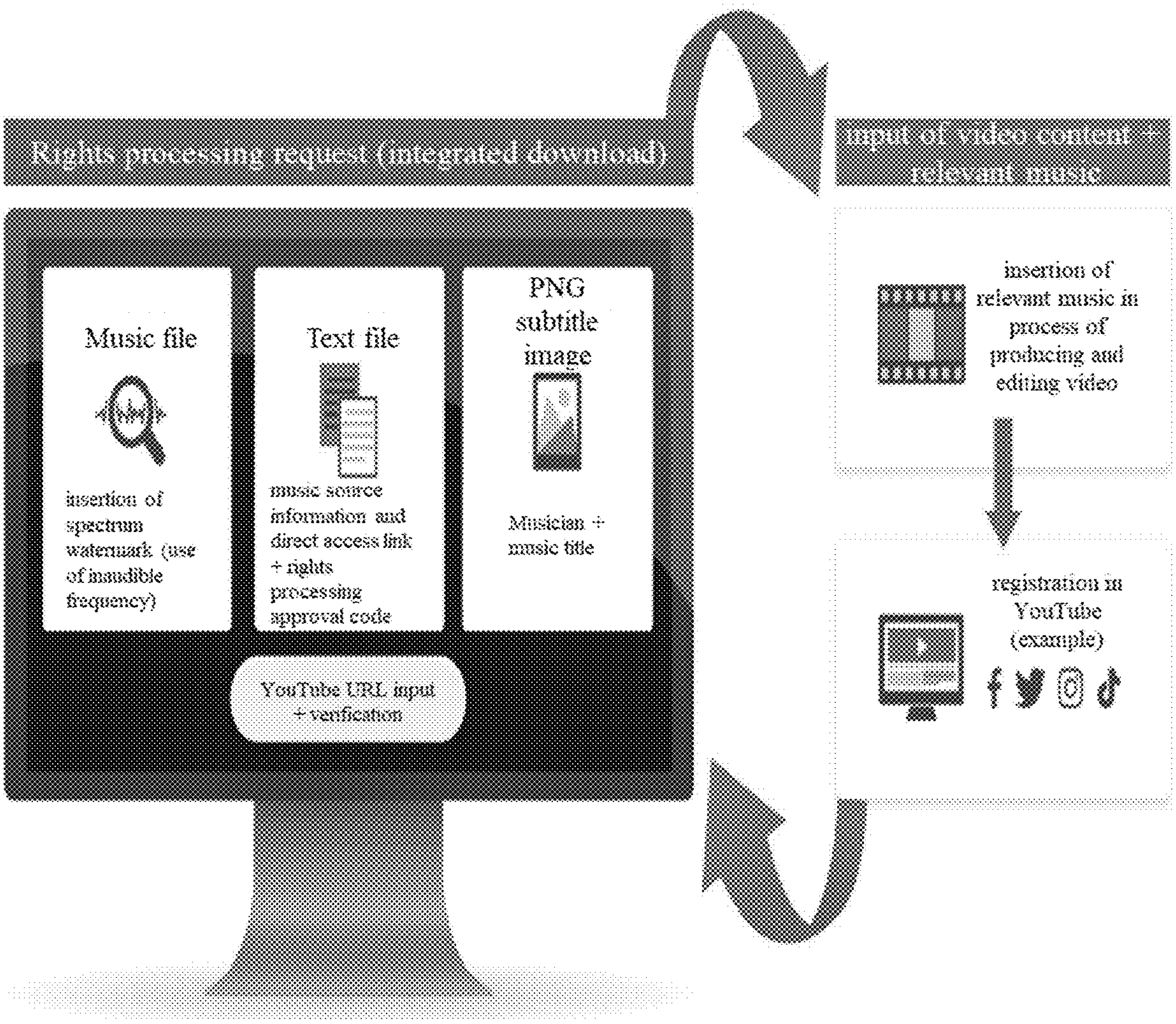
FIG. 4 is a schematic diagram of a music source providing system using audio watermark insertion according to a music source providing method according to another embodiment of the present disclosure.

FIG. 4 is a schematic diagram of a music source providing system using audio watermark insertion according to a music source providing method according to another embodiment of the present disclosure.

As illustrated in FIG. 4, the music source providing system may insert an audio watermark (for example, a spectrum watermark) into an inaudible frequency of a music source file, provide the music source information, and an access link (for example, a URL) of the content in which a music source is used and a rights processing approval code in a text file format (for example, docx or txt), and provide a musician and a song title of the music source in an image file format (for example, png, jpg, webp, or avif).

In addition, when a user inserts a music source downloaded from the music source providing system into a video content and uploads it to a video platform (for example, YouTube), and then inputs a URL of the video platform for the video content uploaded to the music source providing system, the music source providing system may perform verification therefor by using the input URL to check whether the music source is used for the intended purpose or intended use.

According to the above-described embodiments of the present disclosure, illegal copying or usage of a music source may be prevented by inserting an audio watermark in consideration of a music source usage purpose and whether music sources are identical.

In addition, the quality of a music source may be maintained by simultaneously inserting audio watermarks into an ultra-low frequency band and an ultra-high frequency band, and by inserting an audio watermark in the highest frequency energy level in a predetermined section.

In addition, by determining a usage fee payment rate for a music source in consideration of the purpose and usage of the music source, revenue may be delivered objectively to the owner and author.

In other words, each time an individual user downloads a music source to use the music source, a meaningful and variable audio watermark may be inserted into the music source and delivered to the user.

In addition, by creating content using the music source into which an audio watermark is inserted and uploading a URL representing the content to a music source providing system, the audio watermark inserted into the music source of the content may be decrypted to decrypt a user who uses the music source, the purpose of using the music source, the frequency of using the music source, copyright usage rights of the music source, and a usage duration of the music source, and thus, the usage fee may be automatically calculated.

The present disclosure is described with reference to the embodiments illustrated in the drawings, but the embodiments are merely examples, and those skilled in the art will understand that various modifications and equivalent other embodiments may be derived from the embodiments. Therefore, the true technical protection scope of the present disclosure should be determined by the technical idea of the patent claims below.

What is claimed is:

1. A method of inserting an audio watermark specialized for music usage and non-fungible token (NFT) and providing a music source, the method comprising:

receiving a music source download request from a user who accesses a music source providing system;

authenticating whether the user is a legitimate user;

receiving a music source usage purpose from the user when the user is the legitimate user;

inserting an audio watermark including different types of data information into the music source according to the music source usage purpose;

performing a music source download requested by the user;

detecting a usage frequency, a playback time, and a usage purpose of corresponding content in which the music source is used; and determining a usage fee payment rate based on the usage frequency, a playback time, and a usage purpose of the detected content and paying a usage fee to an owner and an author of the music source.

2. The method of claim 1, wherein the music source usage purpose includes at least one of broadcast content, game insertion, movie insertion, promotion and advertisement, and performance.

3. The method of claim 1, further comprising:

receiving, from the user, whether to use the music source online or offline; and receiving a corresponding uniform resource locator (URL) address when using the music source online, and receiving address information on the music source when using the music source offline.

4. The method of claim 1, wherein in the inserting of the audio watermark into the music source, the audio watermark is inserted in 10-second units or the audio watermark is inserted in a highest frequency energy level within 10 seconds of a first playback, and greatest energy is inserted within 5 to 10 seconds from an inserted point in time.

5. The method of claim 1, wherein in the inserting of the audio watermark into the music source, the audio watermark is inserted simultaneously in an ultra-low frequency band of 40 Hz or less and an ultra-high frequency band of 18,000 Hz or more.

6. The method of claim 5, wherein the ultra-low frequency band is 20 Hz or more and the ultra-high frequency band is 20,000 Hz or less.

7. The method of claim 1, wherein, in the inserting of the audio watermark into the music source, even when the same music source is used, when music source usage purposes are different, different types of data information are stored in the audio watermark.

8. The method of claim 1, wherein in the inserting of the audio watermark into the music source, even when music source usage purposes are the same, when music sources are different from each other, different types of data information are stored in the audio watermark.

9. The method of claim 1, wherein the data information includes at least one of basic music source information (a release date, an artist, an author, a performer, a playback length, and a genre) of the music source, user information (an encrypted identifier required for user authentication), use-related information (a usage approval number, a usage right expiration period, and a music usage purpose), and NFT information.

10. The method of claim 9, wherein a permanent usage right is provided when a user who downloads the music source through the NFT information matches an owner.

11. The method of claim 1, wherein the usage purpose indicates a purpose for which the music source is used among a title song, an ending song, and a simple back ground music (BGM).

* * * * *